US010324597B2

(12) United States Patent
Takahashi (10) Patent No.: US 10,324,597 B2
(45) Date of Patent: Jun. 18, 2019

(54) ELECTRONIC APPARATUS AND METHOD FOR CONTROLLING THE SAME

(71) Applicant: CANON KABUSHIKI KAISHA, Tokyo (JP)

(72) Inventor: Ryo Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 626 days.

(21) Appl. No.: 14/831,732

(22) Filed: Aug. 20, 2015

(65) Prior Publication Data
US 2016/0054896 A1 Feb. 25, 2016

(30) Foreign Application Priority Data
Aug. 25, 2014 (JP) .................................. 2014-170465

(51) Int. Cl.
*G06F 3/0481* (2013.01)
*G06F 3/0488* (2013.01)
*G06F 3/0484* (2013.01)
*G06F 3/041* (2006.01)
*G06F 3/0482* (2013.01)
*H04N 5/232* (2006.01)
*G03B 17/20* (2006.01)

(52) U.S. Cl.
CPC ......... *G06F 3/04842* (2013.01); *G03B 17/20* (2013.01); *G06F 3/0418* (2013.01); *G06F 3/0482* (2013.01); *G06F 3/04886* (2013.01); *H04N 5/23216* (2013.01); *H04N 5/23293* (2013.01)

(58) Field of Classification Search
None
See application file for complete search history.

(56) References Cited

U.S. PATENT DOCUMENTS

| | | | | |
|---|---|---|---|---|
| 5,712,995 A | * | 1/1998 | Cohn | G06F 3/0481 715/792 |
| 5,801,699 A | * | 9/1998 | Hocker | G06F 3/04817 715/781 |
| 5,953,008 A | * | 9/1999 | Hagiuda | G06F 3/0486 345/630 |
| 6,816,176 B2 | * | 11/2004 | Laffey | G06F 3/04842 715/835 |
| 7,134,089 B2 | * | 11/2006 | Celik | G06F 3/0481 715/767 |

(Continued)

FOREIGN PATENT DOCUMENTS

| | | |
|---|---|---|
| JP | 2001-273599 A | 10/2001 |
| JP | 2001-326843 A | 11/2001 |

*Primary Examiner* — Yongjia Pan
(74) *Attorney, Agent, or Firm* — Canon USA, Inc., IP Division (57) ABSTRACT

There are provided a setting unit, a selecting unit, a moving unit, and a reception unit. The setting unit sets each of sensitive regions of a plurality of display items in a wider region than each of display regions of the plurality of display items. The selecting unit selects any of the plurality of display items. The moving unit moves a display item in accordance with a touch operation. The reception unit receives a touch operation as an operation to a display item having been selected when a touch operation to an overlapped region is detected. The overlapped region is a region in which the sensitive regions of the plurality of display items overlap.

14 Claims, 8 Drawing Sheets

(56) References Cited

U.S. PATENT DOCUMENTS

| | | | | |
|---|---|---|---|---|
| 7,395,515 B2* | 7/2008 | Konar | ................ | G06F 3/04812 |
| | | | | 345/662 |
| 7,546,532 B1* | 6/2009 | Nichols | ................ | G11B 27/034 |
| | | | | 715/716 |
| 8,196,043 B2* | 6/2012 | Crow | ................ | G06F 3/048 |
| | | | | 715/716 |
| 8,560,966 B2* | 10/2013 | Cotterill | ................ | G06F 3/0485 |
| | | | | 345/156 |
| 8,826,192 B1* | 9/2014 | Rinckes | ................ | G06F 3/04847 |
| | | | | 345/173 |
| 8,977,966 B1* | 3/2015 | Saurav | ................ | G06F 3/00 |
| | | | | 345/172 |
| 2002/0075333 A1* | 6/2002 | Dutta | ................ | G06F 3/04842 |
| | | | | 715/862 |
| 2002/0093534 A1* | 7/2002 | Konar | ................ | G06F 3/04812 |
| | | | | 715/764 |
| 2005/0223335 A1* | 10/2005 | Ichikawa | ................ | G06F 3/0481 |
| | | | | 715/801 |
| 2008/0122796 A1* | 5/2008 | Jobs | ................ | G06F 3/0488 |
| | | | | 345/173 |
| 2012/0030566 A1* | 2/2012 | Victor | ................ | G06F 3/0482 |
| | | | | 715/702 |
| 2015/0103001 A1* | 4/2015 | Li | ................ | G06F 3/0488 |
| | | | | 345/157 |

\* cited by examiner

ELECTRONIC APPARATUS AND METHOD FOR CONTROLLING THE SAME

BACKGROUND OF THE INVENTION

Field of the Invention

The present disclosure generally relates to electronics and, more particularly, to an electronic apparatus and a method for controlling the electronic apparatus.

Description of the Related Art

Recently, an electronic apparatus, such as a smartphone and a digital camera including a touch panel mounted thereon has been widely used. An exemplary operation method using a touch panel is as follows. When a display item, such as a touch button, is displayed on the touch panel and the display item is touched, a function corresponding to the display item that has been touched is typically performed.

However, accurately touching a region on which the display item has been displayed is not necessarily an easy task. Japanese Patent Application Laid-Open No. 2001-326843 discloses an operation method in which a touch button can be touched without an accurate touch operation by setting a touch sensitive region that corresponds to a touch button, in a wider area than the touch button.

As in Japanese Patent Application Laid-Open No. 2001-326843, when a touch sensitive region is set in a wider area than a display item and when a plurality of display items is displayed in close with each other, touch sensitive regions of the display items are likely to overlap. When an overlapped touch sensitive region like this is touched, it is difficult to determine which display item a user intends to operate. Therefore, a function of a different display item from a display item intended by the user may be performed. As a result, an operation intended by the user sometimes cannot be performed.

SUMMARY OF THE INVENTION

The present disclosure is directed to performing a touch operation to a display item intended by a user even when a plurality of display items is in close with each other.

According to an aspect of the present disclosure, an electronic apparatus includes a display control unit configured to display a plurality of display items on a display unit; a detecting unit configured to detect a touch operation to the display unit; a setting unit configured to set a plurality of sensitive regions for receiving a touch operation to each of the plurality of display items, in a wider region than each of display regions of the plurality of display items; a selecting unit configured to select any of the plurality of display items; a moving unit configured to move a touched display item in accordance with a touch operation detected by the detecting unit; and a reception unit configured to receive, when the detecting unit detects a touch operation to an overlapped region including sensitive regions of the plurality of display items overlapping each other due to approach of the plurality of display items to each other by the moving unit, the detected touch operation as an operation to a display item that has been selected by the selecting unit.

Further features of the present disclosure will become apparent from the following description of exemplary embodiments (with reference to the attached drawings).

DESCRIPTION OF THE EMBODIMENTS

Various exemplary embodiments, features, and aspects of the disclosure will be described in detail below with reference to the drawings. Note that in the embodiment to be described below, a case where a digital camera is applied as an exemplary imaging apparatus according to an embodiment of the present disclosure will be described.

Figure 1:
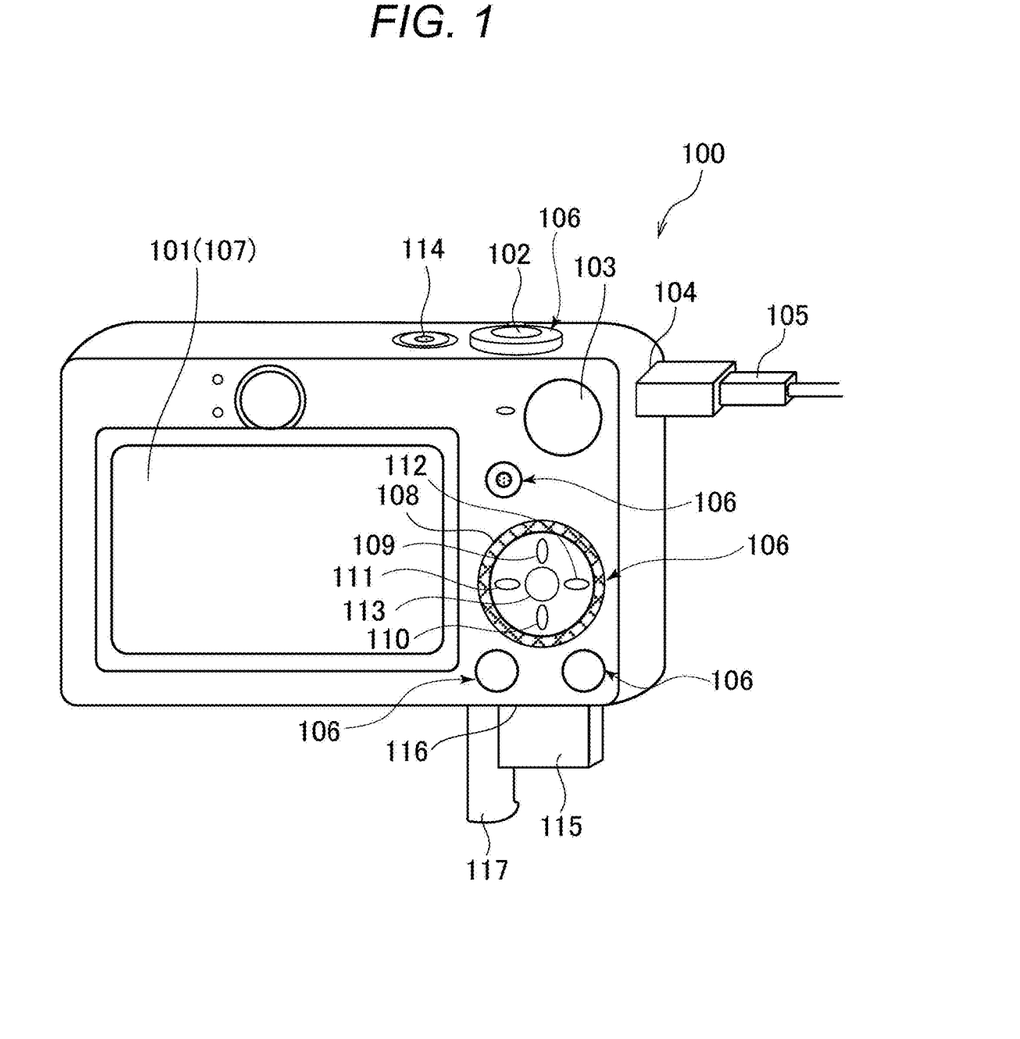
FIG. 1 is an external view of a digital camera according to the present embodiment.

FIG. 1 is an external view of a digital camera according to the present embodiment.

A display unit 101 is an exemplary display and displays an image and various information. A shutter button 102 serves as a button with which a user issues an image capturing instruction. A mode selection switch 103 serves as a switch with which the user switches various modes of the digital camera 100. A connector 104 is a connection unit for coupling, to the digital camera 100, a connection cable 105 for communicating with an external apparatus, such as a personal computer or a printer. As used herein, the term "unit" generally refers to any combination of software, firmware, hardware, or other component, such as circuitry, that is used to effectuate a purpose.

Operation units 106 receive various operations by the user. The operation units 106 include operating members such as various switches, buttons, a touch panel 107 disposed on a screen of the display unit 101, and a controller wheel 108. The operation units 106 include a four-direction button including an upper button 109, a lower button 110, a left button 111, and a right button 112; and a set button 113. Note that the upper button 109 and the lower button 110 are examples of a first operating member, and the buttons are collectively called an up-down key. The left button 111 and the right button 112 are examples of a second operating member, and the buttons are collectively called a left-right key.

A power switch 114 serves as a push-button for switching between power-on and power-off. A storage medium 115 includes, for example, a memory card and a hard disk. A storage medium slot 116 houses the storage medium 115. The storage medium 115 housed in the storage medium slot 116 is capable of communicating with the digital camera 100. Therefore, image data can be stored in and reproduced from the storage medium 115. A lid 117 closes the storage medium slot 116. As shown in FIG. 1, opening the lid 117 enables the storage medium 115 to be housed into and extracted from the storage medium slot 116.

Figure 2:
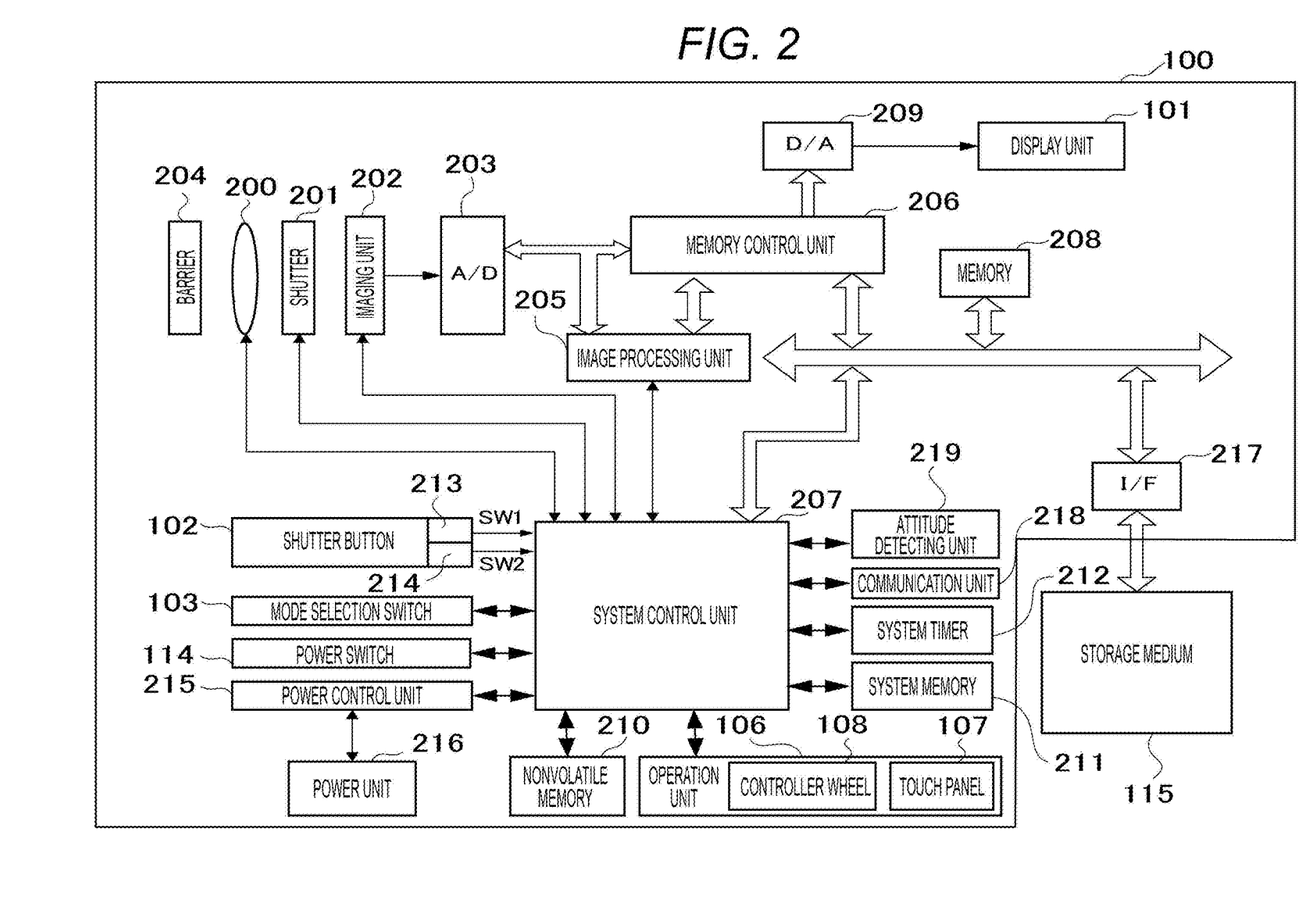
FIG. 2 is a block diagram of a configuration of the digital camera.

FIG. 2 is a block diagram of a configuration of the digital camera 100. Note that constituent elements similar to those in FIG. 1 are denoted with the same reference signs, and the descriptions thereof are omitted.

A capturing lens 200 is a lens group including a zoom lens and a focus lens. A shutter 201 is provided with an aperture function. An imaging unit 202 serves as an imaging element that includes, for example, a charged coupled device (CCD) element or a complementary metal-oxide-semiconductor (CMOS) element, which converts an optical image into an electrical signal. An analog to digital (A/D) converter 203 converts an analog signal output from the imaging unit 202 into a digital signal. A barrier 204 covers the capturing lens 200 of the digital camera 100 so as to prevent an imaging system including the capturing lens 200, the shutter 201, and the imaging unit 202 from being stained or damaged.

An image processing unit 205 performs resizing processing and color conversion processing, such as predetermined pixel interpolation and reduction, to image data from the A/D converter 203 or image data from a memory control unit 206. In addition, the image processing unit 205 performs predetermined calculation processing using captured image data. A system control unit 207 performs exposure control and ranging control, based on a calculation result obtained from the image processing unit 205. Through a series of the control by the system control unit 207, autofocus (AF) processing, automatic exposure (AE) processing, and electronic flash (EF) processing of a through-the-lens (TTL) type are performed. Furthermore, the image processing unit 205 performs predetermined calculation processing using the captured image data, and performs automatic white balance (AWB) processing of the TTL type based on a calculation result obtained from the predetermined calculation processing.

The image data from the A/D converter 203 is directly written in a memory 208 through the image processing unit 205 and the memory control unit 206, or the memory control unit 206. The memory 208 stores image data that is obtained by the imaging unit 202 and converted into digital data by the A/D converter 203, and image data to be displayed on the display unit 101. The memory 208 is provided with a large storage capacity enough to store a predetermined number of still images, and moving images and audio with a predetermined time length. In addition, the memory 208 serves as a memory (video memory) for displaying an image.

A digital to analog (D/A) converter 209 converts, into an analog signal, the image data for display stored in the memory 208 so as to supply the analog signal to the display unit 101. Therefore, the display unit 101 displays the image data for display written in the memory 208, through the D/A converter 209. The display unit 101 performs, on a display device such as a liquid crystal display (LCD), display corresponding to the analog signal from the D/A converter 209. The D/A converter 209 performs analog conversion to the digital signal stored in the memory 208 after A/D conversion once by the A/D converter 203. After that, an analog signal is successively transmitted to and displayed on the display unit 101 so as to display a through image (live-view display). Therefore, the display unit 101 serves as an electronic view finder.

A nonvolatile memory 210 serves as an electrically erasable and recordable storage medium and includes, for example, an EEPROM (electrically erasable programmable read-only memory). The nonvolatile memory 210 stores, for example, a constant and a program for operating the system control unit 207. The program performs various flowcharts to be described later according to the present embodiment.

The system control unit 207 controls the entire digital camera 100. The system control unit 207 corresponds to an example of a display control unit, a setting unit, a reception unit, a moving unit, and a notification unit. The system control unit 207 executes the program stored in the nonvolatile memory 210 so as to implement each processing to be described later in the present embodiment. For example, a RAM is used for a system memory 211. The program read from the nonvolatile memory 210, a variable, and the constant for operating the system control unit 207 are developed into the system memory 211. The system control unit 207 also controls, for example, the memory 208, the D/A converter 209, and the display unit 101 so as to perform display control. A system timer 212 serves as a clocking unit for measuring time to be used for various control or time of a clock embedded in the digital camera 100.

The mode selection switch 103, a first shutter switch 213, a second shutter switch 214, and the operation units 106 serve as operating units for inputting various operating instructions into the system control unit 207.

The mode selection switch 103 can switch an operating mode of the system control unit 207 to any of, for example, a still image recording mode, a moving image capturing mode, and a reproducing mode. The still image recording mode includes, for example, an automatic capturing mode, an automatic scene determination mode, a manual mode, various scene modes for capturing settings for respective capturing scenes, a program AE mode, and a custom mode. The mode selection switch 103 can directly switch to any of the above modes included in a menu button. Alternatively, other operating units may be used to switch to any of the modes included in the menu button after the mode selection switch 103 once switches to the menu button. Similarly, the moving image capturing mode may include a plurality of modes. In addition, the reproducing mode includes a moving image edit mode to be described later.

The first shutter switch 213 is turned on during operation of the shutter button 102, which is the so-called half-depression (capturing preparation instruction), so as to generate a first shutter switch signal SW1. The first shutter switch signal SW1 enables the system control unit 207 to start operation of, for example, AF processing, AE processing, AWB processing, and EF processing.

The second shutter switch 214 is turned on upon completion of the operation of the shutter button 102, which is the so-called full-depression (capturing instruction), so as to generate a second shutter switch signal SW2. The second shutter switch signal SW2 enables the system control unit 207 to start a series of capturing processing operations that includes reading of the signal from the imaging unit 202 and writing of the image data into the storage medium 115.

Various function icons displayed on the display unit 101 are, for example, selectively operated so that each of the operating members of the operation units 106 is appropriately allocated to a function in each scene. Therefore, the operating members of the operation units 106 serve as various function buttons. The function buttons include, for example, an end button, a back button, an image feeding button, a jump button, a narrowing-down button, and an attribute change button. For example, when the menu button is pressed, a menu screen that enables various settings is displayed on the display unit 101. The user can intuitively perform the various settings using the menu screen displayed on the display unit 101, the up-down key, the left-right key, and the set button.

The controller wheel 108 is an operating member capable of a rotary operation, included in the operation units 106.

The controller wheel 108 is used, for example, to instruct a selection item together with the up-down key and the left-right key.

A power control unit 215 includes, for example, a battery detecting circuit, a DC-DC converter, and a switch circuit for switching a block that is electrically conducted, so as to detect whether a battery is mounted, a type of a battery, and a remaining battery capacity. In addition, based on detected results and an instruction of the system control unit 207, the power control unit 215 controls the DC-DC converter so as to supply, for a period of time, a voltage to each of the units including the storage medium 115. A power unit 216 includes a primary battery such as an alkaline battery and a lithium battery, a secondary battery such as an NiCd battery, an NiMH battery, and an Li battery, and an AC adapter. A storage medium I/F 217 serves as an interface with the storage medium 115. The storage medium 115 includes, for example, a semiconductor memory, an optical disk, or a magnetic disk.

A communication unit 218 transmits and receives, for example, an image signal, a video signal, and an audio signal to and from an external apparatus through wireless communication or a wired cable. The communication unit 218 can also be connected to a wireless LAN and the Internet. The communication unit 218 can transmit an image (including a through image) captured by the imaging unit 202 and an image stored in the storage medium 115. In addition, the communication unit 218 can receive image data and other various information from the external apparatus.

An attitude detecting unit 219 detects an attitude of the digital camera 100 in a gravity direction. Based on the attitude detected by the attitude detecting unit 219, the system control unit 207 can determine whether the image captured by the imaging unit 202 is an image captured by the digital camera 100 held in a lateral direction or a longitudinal direction. The system control unit 207 can add orientation information in accordance with the attitude detected by the attitude detecting unit 219, to an image file of the image captured by the imaging unit 202. The system control unit 207 can also rotate and store the image. For example, an acceleration sensor and a gyro sensor can be used for the attitude detecting unit 219.

A touch panel 107 serving as a detecting unit that can detect contact (touch) with the display unit 101 is provided as one of the operation units 106. The touch panel 107 and the display unit 101 can be integrally formed. For example, the touch panel 107 is attached to an upper layer of a display surface of the display unit 101 in order not to cause transmittance of light to optically deteriorate display of the display unit 101. Input coordinates on the touch panel 107 and display coordinates on the display unit 101 are made to correspond to each other. As a result, it is possible to constitute a GUI designed as if the user could directly operate the screen displayed on the display unit 101. Any of various methods, such as a resistance film method, an electrostatic capacitance method, a surface acoustic wave method, an infrared method, an electromagnetic induction method, an image recognition method, and an optical sensor method can be used for the touch panel 107. Any of a method for detecting a touch when the touch panel 107 is touched, and a method for detecting a touch by approach of a finger or a stylus pen to the touch panel 107 may be used.

The system control unit 207 can detect the following operations to the touch panel 107 by the user or states of the touch panel 107.

(1) A state in which a finger or a stylus pen that has not touched the touch panel 107 touches the touch panel 107 anew, namely, a start of a touch (hereinafter referred to as Touch-Down).

(2) A state in which the finger or the stylus pen has touched the touch panel 107 (hereinafter referred to as Touch-On).

(3) A state in which the finger or the stylus pen moves while touching the touch panel 107 (hereinafter referred to as Touch-Move).

(4) A state in which the finger or the stylus pen that has touched the touch panel 107 is lifted (hereinafter referred to as Touch-Up).

(5) A state in which nothing touches the touch panel 107 (hereinafter referred to as Touch-Off).

Here, when a Touch-Down is detected, a Touch-On is also detected. After the Touch-Down, typically the Touch-On is continuously detected as long as a Touch-Up is not detected. When a Touch-Move is detected, the Touch-On has been detected. Even when the Touch-On is detected, the Touch-Move is not detected without movement of a touch position. After the Touch-Up of all the fingers or the stylus pen that have touched the touch panel 107 is detected, a Touch-Off occurs.

The system control unit 207 is notified of, through an internal bus, the above operations and states, and position coordinates at which the finger or the stylus pen has touched the touch panel 107. The system control unit 207 determines which operation has been performed on the touch panel 107, based on information the system control unit 207 is notified of. In terms of a Touch-Move, the system control unit 207 can determine a moving direction in which the finger or the stylus pen moves on the touch panel 107, for each vertical component and horizontal component on the touch panel 107, based on a change of the position coordinates. When a Touch-Up is performed through a certain Touch-Move after a Touch-Down on the touch panel 107, it is assumed that a stroke has been drawn. An operation in which the stroke is quickly drawn is called a flick. The flick is an operation in which the finger is lifted after the finger quickly moves a certain distance while touching the touch panel 107. In other words, this is an operation in which the touch panel 107 is quickly traced with the finger, like a flick with a finger. When the system control unit 207 detects a Touch-Move that has been performed over a predetermined distance or more at a predetermined speed or more and a Touch-Up, the system control unit 207 determines that a flick has been performed. In addition, the system control unit 207 determines that a drag has been performed upon detecting that a Touch-Move has been performed over the predetermined distance or more at less than the predetermined speed.

Figure 3:
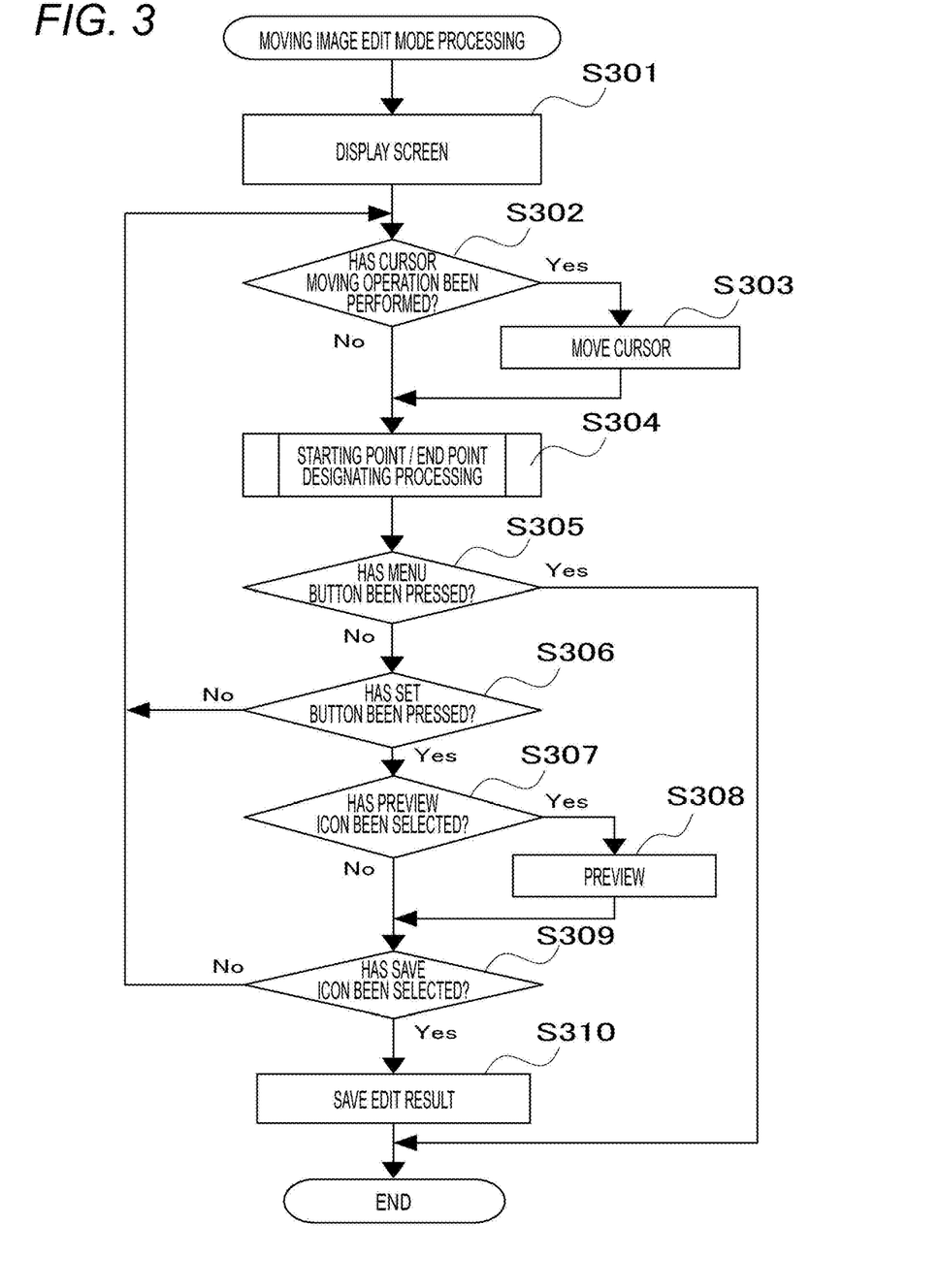
FIG. 3 is a flowchart of moving image edit mode processing.

Next, moving image edit mode processing of the digital camera 100 will be described with reference to a flowchart in FIG. 3. The system control unit 207 develops the program stored in the nonvolatile memory 210 into the system memory 211 and executes the developed program so that processing of the flowchart in FIG. 3 is implemented.

Note that the moving image edit mode processing receives an instruction of a moving image edit from the user while a moving image stored in the storage medium 115 is being displayed on the display unit 101 in the reproducing mode. As a result, the moving image edit mode processing is started. In the moving image edit mode, the user can segment and store a period of a part of the moving image. More specifically, for a current moving image that has been displayed, a starting point can be designated and a period before the starting point can be deleted (referred to as front cut). For the current moving image that has been displayed, an end point can be designated and a period after the end point can be deleted (referred to as rear cut). In other words, an edit can be performed so that a period between the starting point and the end point that are designated by the user is stored. The period is a part of an entire period of the current moving image that has been displayed.

At S301, the system control unit 207 displays an edit screen in the moving image edit mode on the display unit 101.

Figure 4A:
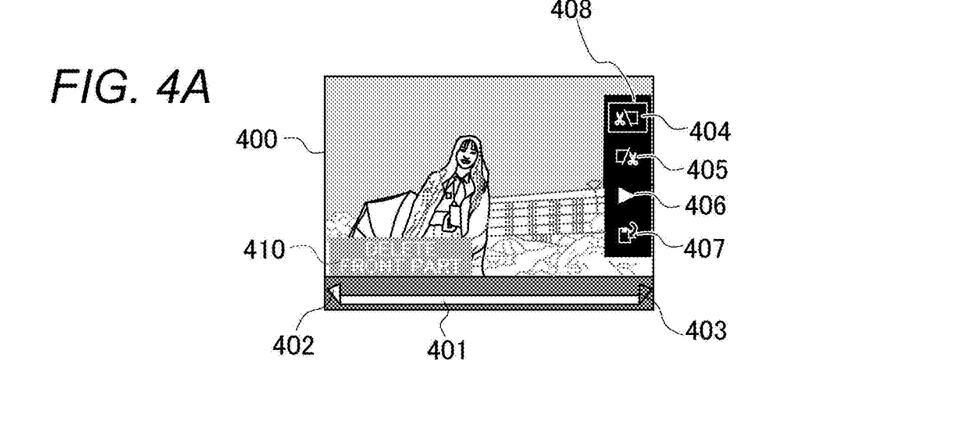
FIGS. 4A to 4D are views of exemplary edit screens.

FIG. 4A is a view of an exemplary edit screen in the moving image edit mode. A current frame video having been selected from a moving image to be edited has been displayed on an edit screen 400, remaining stationary.

A time sequence bar 401 indicates an entire period of the moving image to be edited. A starting point item 402 is a display item for designating the starting point for the front cut. The starting point item 402 can be moved along the time sequence bar 401 in accordance with a user operation. An end point item 403 is a display item for designating the end point for the rear cut. The end point item 403 can be moved along the time sequence bar 401 in accordance with a user operation. However, the starting point item 402 and the end point item 403 cannot be moved to a right side beyond the end point item 403 and to a left side beyond the starting point item 402, respectively.

A starting point selection icon 404 is an icon for selecting the starting point for the front cut. When the left-right key is operated with the starting point selection icon 404 selected, the starting point item 402 can be move to the left side and the right side. Therefore, the user can designate, as the starting point, an arbitrary position in an entire moving image.

An end point selection icon 405 is an icon for selecting the end point for the rear cut. When the left-right key is operated with the end point selection icon 405 selected, the end point item 403 can be move to the left side and the right side. Therefore, the user can designate, as the end point, an arbitrary position in the entire moving image.

The starting point selection icon 404 and the end point selection icon 405 correspond to examples of a selecting unit.

Note that each of the starting point item 402 and the end point item 403 can also be moved by directly touching and dragging each of display positions of the starting point item 402 and the end point item 403. Note that a region that receives a touch operation to the starting point item 402 (sensitive region) and a region that receives a touch operation to the end point item 403 (sensitive region) are arranged so as to be wider than each of display regions of the display items.

Figure 4B:
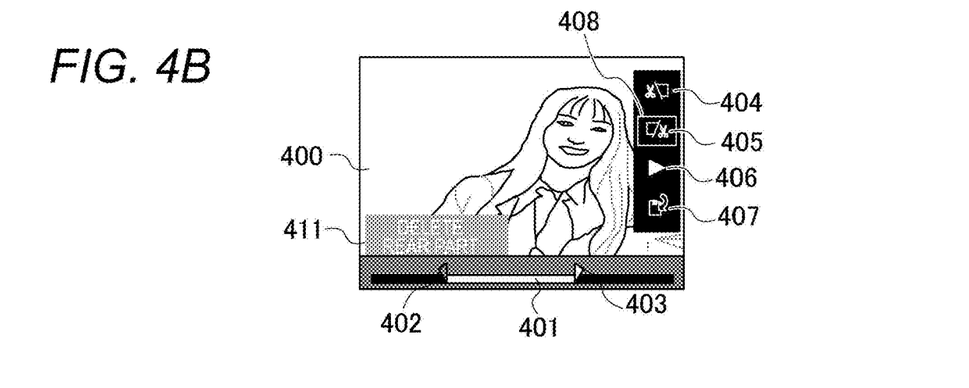
Figure 4C:
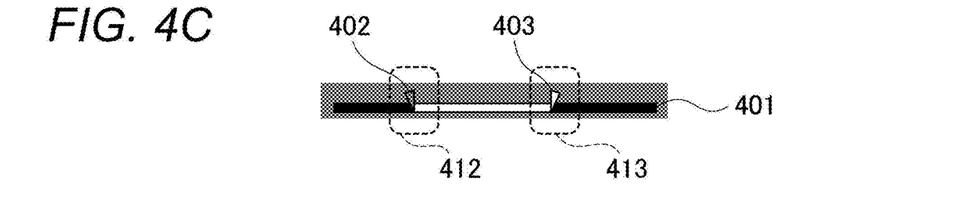

FIG. 4C is a view of a relationship between the display region and the sensitive region of the display item.

A sensitive region 412 of the starting point item 402 is arranged in a wider (larger) region than the starting point item 402 itself. Similarly, a sensitive region 413 of the end point item 403 is arranged in a wider region than the end point item 403 itself. Processing of arranging the sensitive regions corresponds to exemplary processing of the setting unit.

Figure 4D:
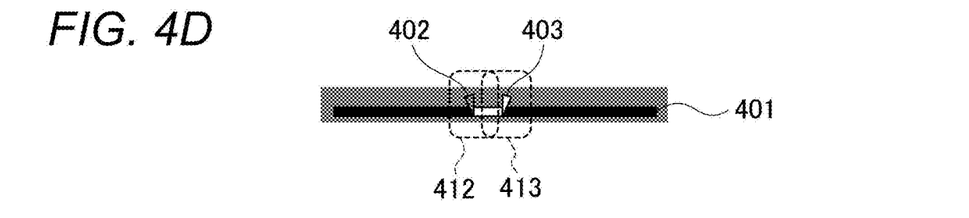

Therefore, each of the starting point item 402 and the end point item 403 displayed in a small area so that a fine position can be designated by the time sequence bar 401, can be easily touched and operated even with, for example, a finger that has a large touch area. Meanwhile, when the sensitive regions are larger than the display regions of the display items themselves and when the starting point item 402 and the end point item 403 are in close with each other, the sensitive regions are likely to overlap as shown in FIG. 4D. In the present embodiment, when a touch operation is performed to the region (overlapped region) in which the sensitive regions overlap, the touch operation is received as a touch operation to a current display item that has been selected. This processing corresponds to exemplary processing of the reception unit. Note that the detailed descriptions will be given later.

Referring back to FIG. 4A, a preview icon 406 serves as an icon for receiving an instruction to reproduce and preview the period from the starting point to the end point. A save icon 407 serves as an icon for receiving an instruction to determine an edit and, at that point, perform an overwrite save or a new save of the period from the starting point to the end point as a moving image file, on the storage medium 115. A cursor 408 is a selection frame for indicating which one of the starting point selection icon 404, the end point selection icon 405, the preview icon 406, or the save icon 407 has been selected. In FIG. 4A, since the starting point selection icon 404 has been selected with the cursor 408, the starting point item 402 has been displayed in a first display mode that indicates a selected state. On the other hand, the end point item 403 has been displayed in a second display mode that indicates a deselected state. An image displayed on the edit screen 400 is a frame image that has been indicated by the starting point item 402.

A guidance display 410 serves as guidance about a current icon that has been selected with the cursor 408. In FIG. 4A, since the starting point selection icon 404 for selecting the starting point for the front cut has been selected, guidance about the front cut has been displayed. The guidance display 410 is displayed for a predetermined period of time (approximately two seconds) after a shift to the moving image edit mode or for a predetermined period of time (approximately two seconds) after a selection of the starting point selection icon 404. After a predetermined period of time, the guidance display 410 is hidden.

Referring back to FIG. 3, at S302, the system control unit 207 determines whether a cursor moving operation has been performed. When an operation of the up-down key or a Touch-Down to any of the starting point selection icon 404, the end point selection icon 405, the preview icon 406, and the save icon 407 is detected, the system control unit 207 determines that the cursor moving operation has been performed. When the cursor moving operation has been determined, the processing proceeds to S303. When the cursor moving operation has not been performed, the processing proceeds to S304.

At S303, the system control unit 207 moves the cursor 408 in accordance with the cursor moving operation. More specifically, when the up-down key is operated, the system control unit 207 moves the cursor 408 in an upward direction or a downward direction selected with the up-down key. In addition, when the Touch-Down to any of the starting point selection icon 404, the end point selection icon 405, the preview icon 406, and the save icon 407 is detected, the system control unit 207 moves the cursor 408 to a position at which the Touch-Down has been performed.

FIG. 4B is a view of the cursor 408 moved to the end point selection icon 405. An image displayed on the edit screen 400 is a frame image at a position that has been indicated by the end point item 403. The end point item 403 has been displayed in the first display mode that indicates the selected state. On the other hand, the starting point item 402 has been displayed in the second display mode that indicates the deselected state. A guidance display 411 has displayed guidance about the rear cut. The guidance display 411 is displayed for a predetermined period of time (approximately two seconds) after a selection of the end point selection icon 405 and the guidance display 411 is hidden after a predetermined period of time.

At S304, the system control unit 207 performs starting point/end point designating processing. Here, positions of the starting point item 402 and the end point item 403 are changed in accordance with a user operation. In other words, the system control unit 207 receives designation of positions of the starting point and the end point from the user. The starting point/end point designating processing will be described later with reference to a flowchart in FIG. 5.

At S305, the system control unit 207 determines whether the menu button included in the operation units 106 has been pressed. When the menu button has been pressed, the positions of the starting point and the end point are cancelled so that the moving image edit mode processing is completed. On the other hand, when the menu button has not been pressed, the processing proceeds to S306.

At S306, the system control unit 207 determines whether the set button 113 included in the operation units 106 has been pressed. When the set button 113 has been pressed, the processing proceeds to S307. When the set button has not been pressed, the processing goes back to S302 and the same processing is repeated.

At S307, the system control unit 207 determines whether the preview icon 406 has been selected (the cursor 408 is on the preview icon 406). When the preview icon 406 has been selected, the processing proceeds to S308. When the preview icon 406 has not been selected, the processing proceeds to S309.

At S308, the system control unit 207 reproduces and displays, on the display unit 101, the period between the starting point and the end point in a moving image to be edited. The user watches a reproduced moving image so as to determine whether the period from the starting point to the end point is a desired period.

At S309, the system control unit 207 determines whether the save icon 407 has been selected (the cursor 408 is on the save icon 407). When the save icon 407 has been selected, the processing proceeds to S310. When the save icon 407 has not been selected, the processing goes back to S302 and the same processing is repeated.

At S310, the system control unit 207 determines an edit and performs an overwrite save or a new save of the period from the starting point to the end point at that point as a moving image file on the storage medium 115. After that, the system control unit 207 completes the moving image edit mode processing.

Figure 5:
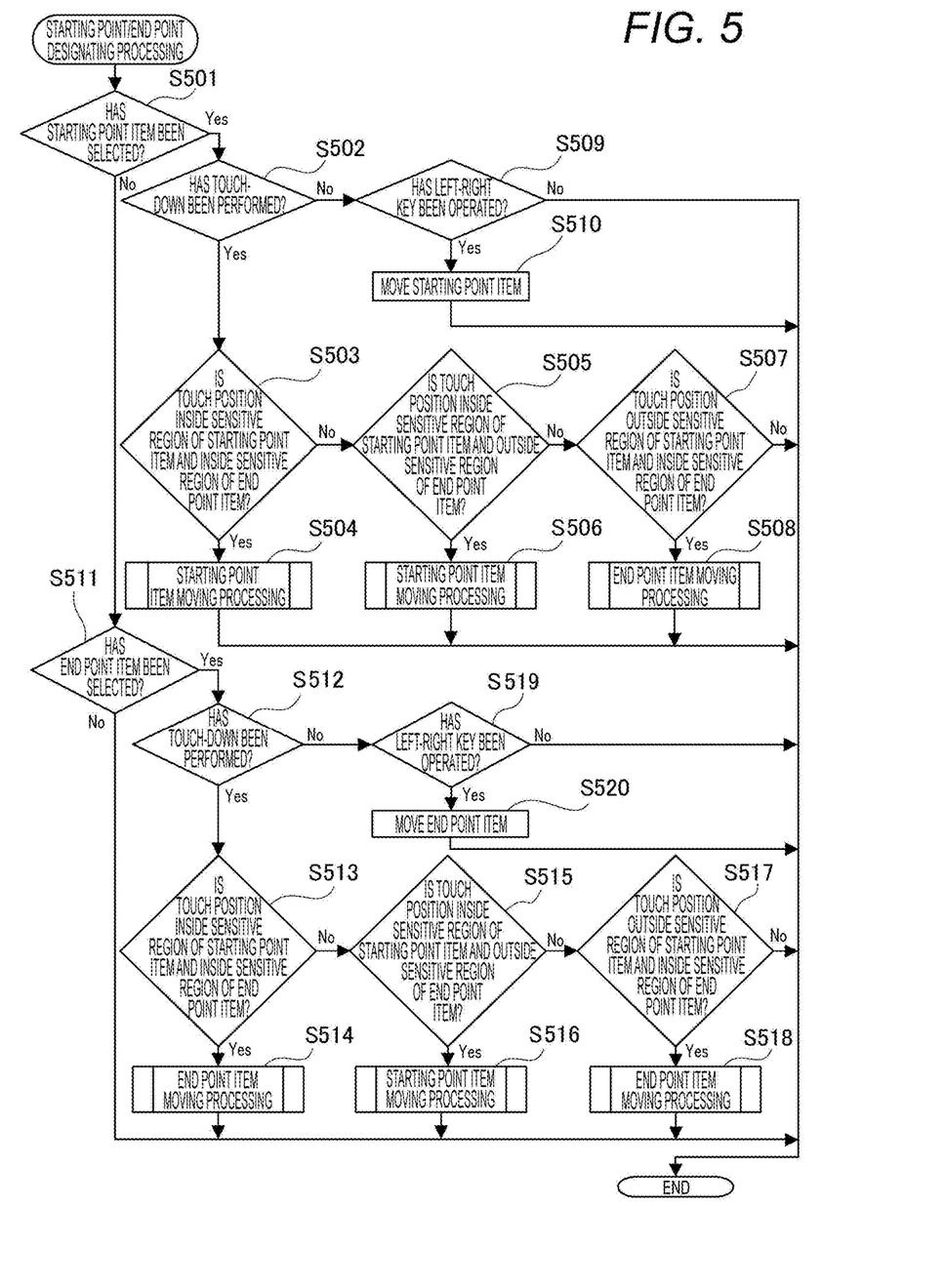
FIG. 5 is a flowchart of starting point/end point designating processing.

FIG. 5 is a flowchart of the starting point/end point designating processing at S304 in FIG. 3. The system control unit 207 develops the program stored in the nonvolatile memory 210 into the system memory 211 and executes the developed program so as to implement processing of the flowchart in FIG. 3.

At S501, the system control unit 207 determines whether the cursor 408 is on the starting point selection icon 404 (the starting point item 402 has been selected). When the cursor 408 is on the starting point selection icon 404, the processing proceeds to S502. When the cursor 408 is not on the starting point selection icon 404, the processing proceeds to S511.

At S502, the system control unit 207 determines whether a Touch-Down has been performed to the touch panel 107. When the Touch-Down has been performed, the processing proceeds to S503. When the Touch-Down has not been performed, the processing proceeds to S509.

At S503, the system control unit 207 determines whether a position touched by the Touch-Down is inside the sensitive region 412 of the starting point item 402 and inside the sensitive region 413 of the end point item 403 (that is, the overlapped region).

Figure 6A:
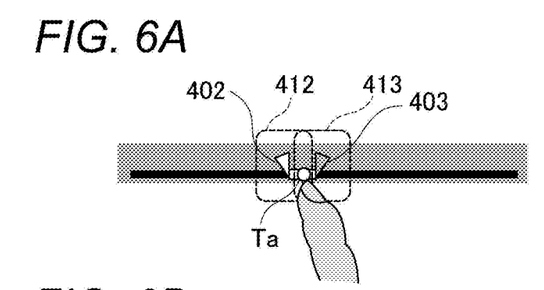
FIGS. 6A to 6F are views of exemplary display regions and sensitive regions of display items.

FIG. 6A is a view of an example of a position touched in the overlapped region, namely, determination as Yes at S503. The overlapped region can be arranged so as not to include the display region of the starting point item 402 or the display region of the end point item 403. As shown in FIG. 6A, when a touched position Ta is inside the sensitive region 412 of the starting point item 402 and inside the sensitive region 413 of the end point item 403, the processing proceeds to S504. Otherwise, the processing proceeds to S505.

At S504, the system control unit 207 performs starting point item moving processing. More specifically, the system control unit 207 moves the starting point item 402 in accordance with a drag operation (Touch-Move). A detailed description of the starting point item moving processing will be given later with reference to a flowchart in FIG. 7A.

At S505, the system control unit 207 determines whether the position touched by the Touch-Down is inside the sensitive region 412 of the starting point item 402 and outside the sensitive region 413 of the end point item 403.

Figure 6B:
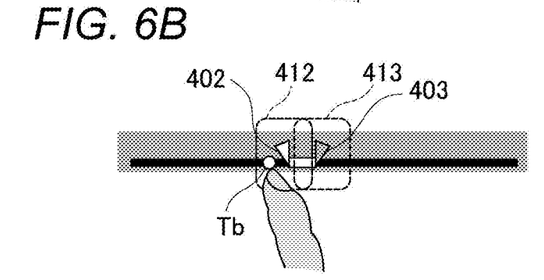

FIG. 6B is a view of an example of a position touched inside a sensitive region of a display item that has been selected, namely, determination as Yes at S505. As shown in FIG. 6B, when a touched position Tb is inside the sensitive region 412 of the starting point item 402 and outside the sensitive region 413 of the end point item 403, the processing proceeds to S506. Otherwise, the processing proceeds to S507.

At S506, the system control unit 207 performs starting point item moving processing. More specifically, the system control unit 207 moves the starting point item 402 in accordance with a drag operation (Touch-Move). The detailed description of the starting point item moving processing will be given later with reference to the flowchart in FIG. 7A.

At S507, the system control unit 207 determines whether the position touched by the Touch-Down is outside the sensitive region 412 of the starting point item 402 and inside the sensitive region 413 of the end point item 403.

Figure 6C:
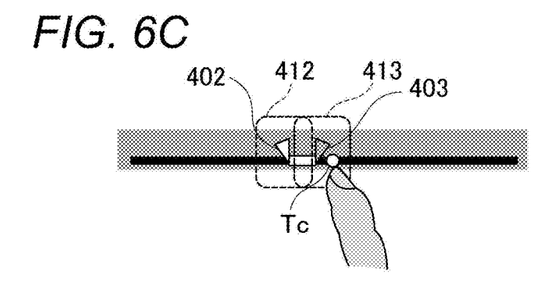

FIG. 6C is a view of an example of a position touched in a sensitive region of a display item that has not been selected, namely, determination of Yes at S507. As shown in FIG. 6C, when a touched position Tc is outside the sensitive region 412 of the starting point item 402 and inside the sensitive region 413 of the end point item 403, the processing proceeds to S508. Otherwise, the starting point/end point designating processing is completed and the moving image edit mode processing proceeds to S305 in FIG. 3.

At S508, the system control unit 207 performs end point item moving processing. More specifically, the system control unit 207 moves the end point item 403 in accordance with a drag operation (Touch-Move). A detailed description of the end point item moving processing will be given later with reference to a flowchart in FIG. 7B.

At S509, the system control unit 207 determines whether the left-right key has been operated. When the left-right key has been operated, the processing proceeds to S510. When the left-right key has not been operated, the starting point/end point designating processing is completed and the moving image edit mode processing proceeds to S305 in FIG. 3.

At S510, the system control unit 207 moves a position of the starting point item 402 along the time sequence bar 401 in accordance with the left-right key operation (a press of the left button 111 or the right button 112). However, the system control unit 207 does not move the starting point item 402 to the right side beyond the end point item 403. Furthermore, the system control unit 207 does not move the starting point item 402 to a position at which the starting point item 402 and the end point item 403 overlap.

At S511, the system control unit 207 determines whether the cursor 408 is on the end point selection icon 405 (the end point item 403 has been selected). When the cursor 408 is on the end point selection icon 405, the processing proceeds to S512. When the cursor 408 is not on the end point selection icon 405, the starting point/end point designating processing is completed and the moving image edit mode processing proceeds to S305 in FIG. 3.

At S512, the system control unit 207 determines whether a Touch-Down has been performed to the touch panel 107. When the Touch-Down has been performed, the processing proceeds to S513. When the Touch-Down has not been performed, the processing proceeds to S519.

At S513, the system control unit 207 determines whether a position touched by the Touch-Down is inside the sensitive region 412 of the starting point item 402 and inside the sensitive region 413 of the end point item 403 (namely, the overlapped region).

Figure 6D:
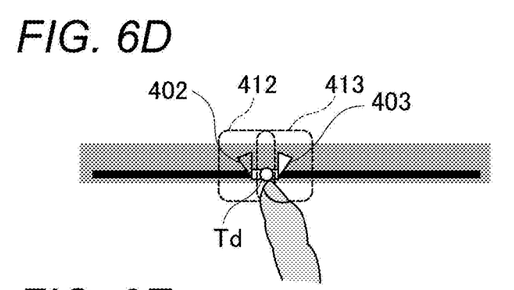

FIG. 6D is a view of an example of a position touched in the overlapped region, namely, determination as Yes at S513. As shown in FIG. 6D, when a touched position Td is inside the sensitive region 412 of the starting point item 402 and inside the sensitive region 413 of the end point item 403, the processing proceeds to S514. Otherwise, the processing proceeds to S515.

At S514, the system control unit 207 performs end point item moving processing. More specifically, the system control unit 207 moves the end point item 403 in accordance with a drag operation (Touch-Move). The detailed description of the end point item moving processing will be given later with reference to the flowchart in FIG. 7B.

At S515, the system control unit 207 determines whether the position touched by the Touch-Down is inside the sensitive region 412 of the starting point item 402 and outside the sensitive region 413 of the end point item 403.

Figure 6E:
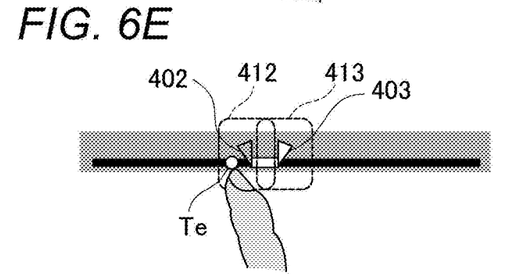

FIG. 6E is a view of an example of a position touched in a sensitive region of a display item that has not been selected, namely, determination as Yes at S515. As shown in FIG. 6E, when a touched position Te is inside the sensitive region 412 of the starting point item 402 and outside the sensitive region 413 of the end point item 403, the processing proceeds to S516. Otherwise, the processing proceeds to S517.

At S516, the system control unit 207 performs starting point item moving processing. More specifically, the system control unit 207 moves the starting point item 402 in accordance with a drag operation (Touch-Move). The detailed description of the starting point item moving processing will be given later with reference to the flowchart in FIG. 7A.

At S517, the system control unit 207 determines whether the position touched by the Touch-Down is outside the sensitive region 412 of the starting point item 402 and inside the sensitive region 413 of the end point item 403.

Figure 6F:
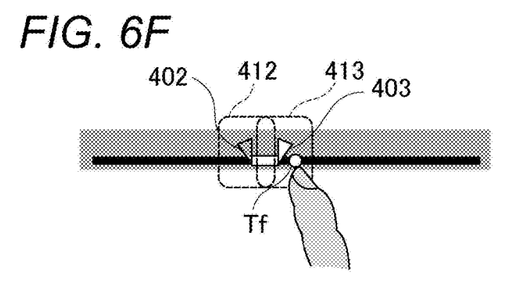

FIG. 6F is a view of an example of a position touched inside a sensitive region of a display item that has been selected, namely, determination as Yes at S517. As shown in FIG. 6F, when a touched position Tf is outside the sensitive region 412 of the starting point item 402 and inside the sensitive region 413 of the end point item 403, the processing proceeds to S518. Otherwise, the starting point/end point designating processing is completed and the moving image edit mode processing proceeds to S305 in FIG. 3.

At S518, the system control unit 207 performs end point item moving processing. More specifically, the system control unit 207 moves the end point item 403 in accordance with a drag operation (Touch-Move). The detailed description of the end point item moving processing will be given later with reference to the flowchart in FIG. 7B.

At S519, the system control unit 207 determines whether a left-right key has been operated. When the left-right key has been operated, the processing proceeds to S520. When the left-right key has not been operated, the starting point/end point designating processing is completed and the moving image edit mode processing proceeds to S305 in FIG. 3.

At S520, the system control unit 207 moves a position of the end point item 403 along the time sequence bar 401 in accordance with the left-right key operation (a press of the left button 111 or the right button 112). However, the system control unit 207 does not move the end point item 403 to the left side beyond the starting point item 402. Furthermore, the system control unit 207 does not move the end point item 403 to the position at which the starting point item 402 and the end point item 403 overlap.

Figure 7A:
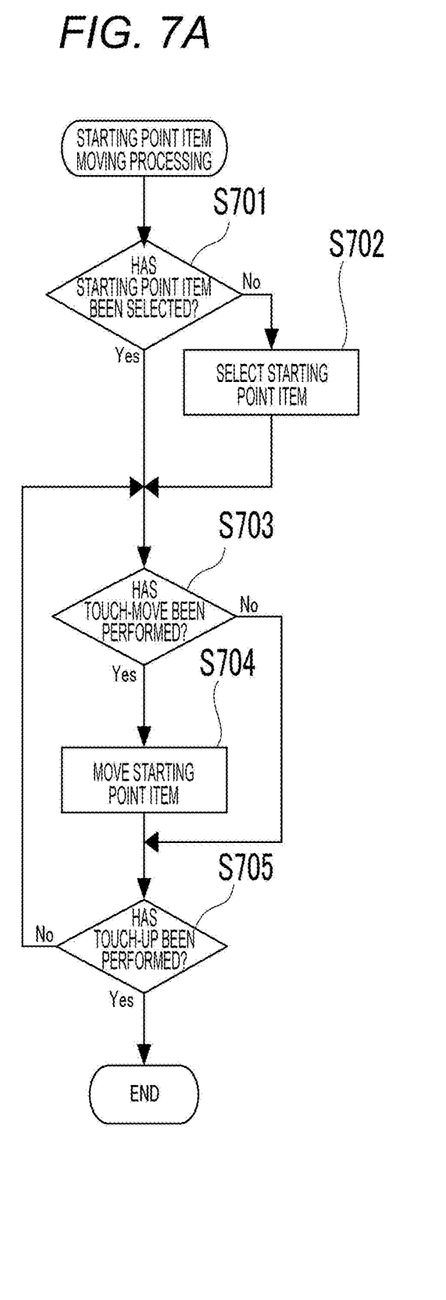
FIGS. 7A and 7B are flowcharts of starting point item/end point item moving processing.

FIG. 7A is the flowchart of the starting point item moving processing at S504, S506, and S516 in FIG. 5. The system control unit 207 develops the program stored in the non-volatile memory 210 into the system memory 211 and executes the developed program so that processing of the flowchart in FIG. 7A is implemented.

At S701, the system control unit 207 determines whether the cursor 408 is on the starting point selection icon 404 (the starting point item 402 has been selected). When the cursor 408 is not on the starting point selection icon 404, the processing proceeds to S702. When the cursor 408 is on the starting point selection icon 404, the processing proceeds to S703.

At S702, the system control unit 207 moves the cursor 408 to the starting point selection icon 404 so that the starting point item 402 is in the selected state. In other words, even when the cursor 408 is positioned on the end point selection icon 405 and the end point item 403 has been selected, the system control unit 207 moves the cursor 408 to the starting point selection icon 404 without depending on the cursor moving operation as in S302. Therefore, here, the system control unit 207 detects a Touch-Down to the starting point item 402 so as to move the cursor 408 to the starting point selection icon 404. Accordingly, on the edit screen 400, the starting point item 402 is in the first display mode that indicates the selected state, and the end point item 403 is in the second display mode that indicates the deselected state. In addition, the system control unit 207 displays, on the edit screen 400, a frame image of a position indicated by the starting point item 402.

At S703, the system control unit 207 determines whether a Touch-Move having a component in a direction along the time sequence bar 401 has been performed. When the Touch-Move has been performed, the processing proceeds to S704. When the Touch-Move has not been performed, the processing proceeds to S705.

At S704, the system control unit 207 causes the starting point item 402 to track a touch position so as to move the starting point item 402 along the time sequence bar 401 in accordance with the Touch-Move. Therefore, the starting point item 402 can be moved to a user's desired position. However, the system control unit 207 does not move the starting point item 402 to the right side beyond the end point item 403. Furthermore, the system control unit 207 does not move the starting point item 402 to the position at which the end point item 403 and the starting point item 402 overlap.

At S705, the system control unit 207 determines whether a Touch-Up has been performed. When the Touch-Up has been performed, the starting point item moving processing is completed. When the Touch-Up has not been performed, the processing goes back to S703 and the same processing is repeated.

Figure 7B:
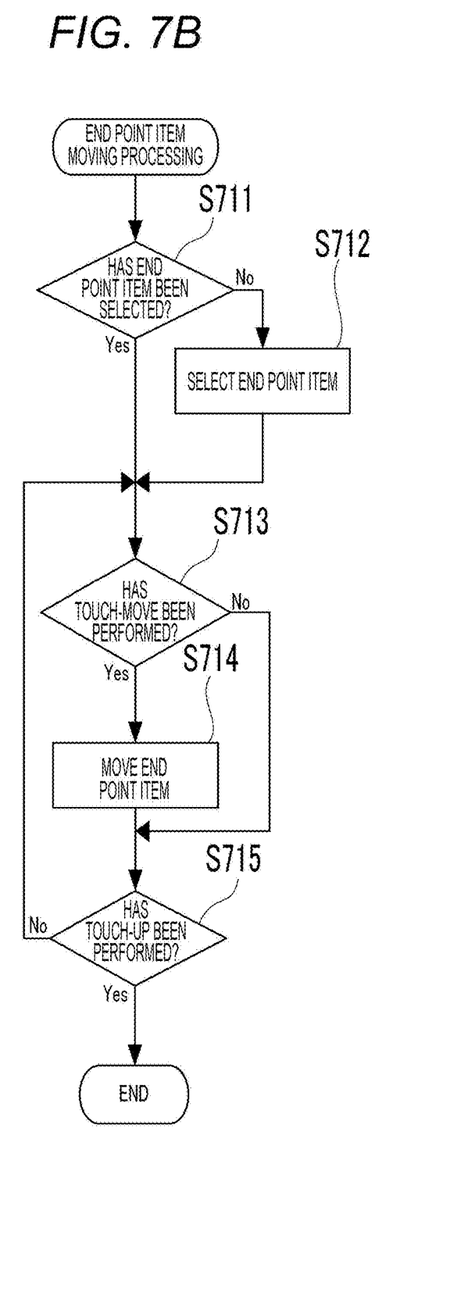

FIG. 7B is the flowchart of the end point item moving processing at S508, S514, and S518 in FIG. 5. The system control unit 207 develops the program stored in the non-volatile memory 210 into the system memory 211 and executes the developed program so that processing of the flowchart in FIG. 7B is implemented.

At S711, the system control unit 207 determines whether the cursor 408 is on the end point selection icon 405 (the end point item 403 has been selected). When the cursor 408 is not on the end point selection icon 405, the processing proceeds to S712. When the cursor 408 is on the end point selection icon 405, the processing proceeds to S713.

At S712, the system control unit 207 moves the cursor 408 to the end point selection icon 405 so that the end point item 403 is in the selected state. In other words, even when the cursor 408 is positioned on the starting point selection icon 404 and the starting point item 402 has been selected, the system control unit 207 moves the cursor 408 to the end point selection icon 405 without depending on the cursor moving operation as in S302. Therefore, here, the system control unit 207 detects a Touch-Down to the end point item 403 so as to move the cursor 408 to the end point selection icon 405. Accordingly, on the edit screen 400, the end point item 403 is in the first display mode that indicates the selected state and the starting point item 402 is in the second display mode that indicates the deselected state. In addition, the system control unit 207 displays, on the edit screen 400, a frame image of a position indicated by the end point item 403.

At S713, the system control unit 207 determines whether a Touch-Move having a component in a direction along the time sequence bar 401 has been performed. When the Touch-Move has been performed, the processing proceeds to S714. When the Touch-Move has not been performed, the processing proceeds to S715.

At S714, the system control unit 207 causes the end point item 403 to track a touch position so as to move the end point item 403 along the time sequence bar 401 in accordance with the Touch-Move. Therefore, the end point item 403 can be moved to a user's desired position. However, the system control unit 207 does not move the end point item 403 to the left side beyond the starting point item 402. Furthermore, the system control unit 207 does not move the end point item 403 to the position at which the starting point item 402 and the end point item 403 overlap.

At S715, the system control unit 207 determines whether a Touch-Up has been performed. When the Touch-Up has been performed, the end point item moving processing is completed. When the Touch-Up has not been performed, the processing goes back to S713 and the same processing is repeated.

As described above, according to the present embodiment, when display items having wider touch sensitive regions than display regions are in close with each other and when a touch operation to an overlapped region in which the respective touch sensitive regions overlap is detected, the touch operation is received as a touch operation to a display item having been selected at that point. Therefore, even when it is difficult to determine at which of a plurality of display items an operation instruction is aimed, a display item assumed to be intended by a user as an object to be operated can be the object to be operated. In other words, the user can perform a touch operation to an intended display item.

Note that, as described above, in the present embodiment, when a touch operation is performed to the overlapped region of the sensitive region 412 of the starting point item 402 and the sensitive region 413 of the end point item 403, the touch operation is received as a touch operation to a display item having been selected at that point. However, the present disclosure is not limited to the present embodiment.

In other words, even when a touch operation to an overlapped region is performed, in a case where the touch operation to a display region of a display item is performed, the touch operation may be received as a touch operation to a display item having been displayed at a touched position regardless of which display item has been selected. More specifically, it is assumed that a Touch-Down is performed to the overlapped region of the sensitive region 412 of the starting point item 402 and the sensitive region 413 of the end point item 403 within the display region of the starting point item 402 itself. In this case, even when the end point item 403 has been selected, the system control unit 207 changes the end point item 403 to the starting point item 402 so that the starting point item 402 is an object to be operated. The user does not visually recognize a sensitive region of a display item. Therefore, when the inside of a display region of the display item itself is touched, it is natural that an operation instruction to a display item having been displayed at a touched position is received. Therefore, when a display region of a display item itself is not touched but a periphery of the display region of the display item is touched, the object to be operated is determined in accordance with a display item that has been selected as in the above embodiment. As a result, usability for the user can be improved.

A change to a different display item from a display item that has been selected before a touch at S702 in FIG. 7A and at S712 in FIG. 7B, has been described. However, the present disclosure is not limited to this case. In other words, a different display item from the display item that has been selected before the touch may be arranged so as not to be moved by a Touch-Move without the change to the different display item from the display item that has been selected before the touch. In this case, when the determination is No at S701 in FIG. 7A and when the determination is No at S711 in FIG. 7B above, processing is completed without performing the processing in accordance with the Touch-Move. Here, for example, it is assumed that the user intends to operate, by a Touch-Move, a different display item from a current display item that has been selected. In this case, it is necessary that a cursor moving operation be performed before a touch operation to the display item (the starting point item 402 or the end point item 403) and one icon the user intends to operate be selected from the starting point selection icon 404 and the end point selection icon 405. The above processing is performed so that an object to be operated becomes clear. As a result, a misoperation upon a designating operation of the starting point and the end point by the Touch-Move can be prevented.

Note that when the starting point item moving processing is performed in accordance with the determination as Yes at S503 in FIG. 5, since the Touch-Down has been performed to the overlapped region, the display item intended by the user may be not the starting point item 402 but the end point item 403. In this case, the user is likely to be confused because the user cannot understand why the starting point item 402 has been selected as the object to be operated. In order to solve this problem, when the determination is Yes at S503 (the Touch-Down in the overlapped region is detected), the user may be notified that the starting point item 402 has been selected as the object to be operated because the starting point selection icon 404 has been selected. This processing corresponds to exemplary processing of the notification unit.

More specifically, in accordance with the determination as Yes at S503 (the Touch-Down in the overlapped region is detected), the system control unit 207 performs an enhanced display, such as flashing of the current starting point selection icon 404 that has been selected, or displays a pop-up message. The user can be notified, by these notifications, that in order to easily move the end point item 403, the cursor 408 is first moved to the position of the end point selection icon 405 by, for example, an up-down key operation, and then a Touch-Move operation is performed. Similarly, when the determination is Yes at S513 (the Touch-Down to the overlapped region is detected), the user may be notified that the end point item 403 has been selected as the object to be operated because the end point selection icon 405 has been selected.

Furthermore, after a direction of the Touch-Move is further determined, a current display item that has been selected may be estimated not to be a display item that the user intends to move and the user may be notified of the estimation. For example, when the determination is Yes at S503, a notification may not be performed at that point. The user may be notified why the starting point item 402 has been selected as the object to be operated in accordance with detection of the Touch-Move in the right direction after the determination. Detection of the Touch-Down to the overlapped region indicates that the starting point item 402 and the end point item 403 are in close with each other. The Touch-move that has been performed in the right direction after the Touch-Down indicates that the user intends to move either the starting point item 402 in the right direction or the end point item 403 in the right direction. However, movement of the starting point item 402 in the right direction indicates movement in the right direction beyond the end point item 403 in close with the starting point item 402. However, the starting point item 402 cannot be moved in the right direction beyond the end point item 403. Therefore, it can be estimated that the user does not intend to move the starting point item 402 in the right direction but intends to move the end point item 403 in the right direction. In other words, the starting point item 402 as the object to be operated is very unlikely to be an item intended by the user, that is, the end point item 403.

Therefore, when the determination is Yes at S503, the system control unit 207 notifies the user why the starting point item 402 has been selected as the object to be operated, in accordance with the detection of the Touch-Move performed in the right direction after the determination. More specifically, the system control unit 207 performs an enhanced display, such as flashing of the current starting point selection icon 404 that has been selected, or displays a pop-up message. Accordingly, the user can recognize that, in order to move the end point item 403 that the user intends to operate, the cursor 408 may be first moved to the end point selection icon 405. Similarly, when the determination is Yes at S513, a notification may not be performed at that point. The user may be notified why the end point item 403 has been selected as the object to be operated, in accordance with detection of the Touch-Move performed in the left direction after the determination.

Figure 8A:
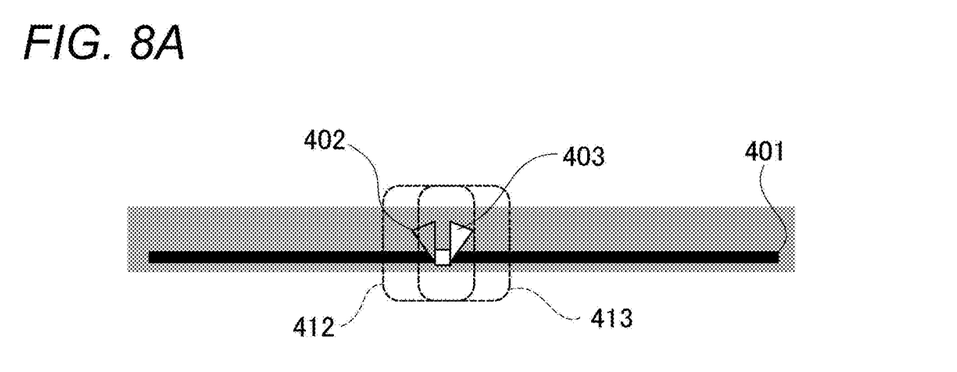
FIGS. 8A and 8B are explanatory views of sensitive region moving processing.
Figure 8B:
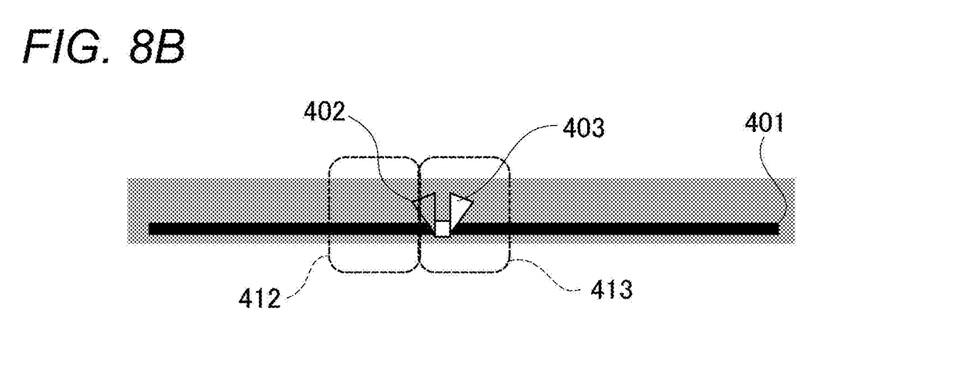

Note that it is assumed in the above embodiment that an overlapped region exists. However, the present disclosure is not limited to this case. The overlapped region may be reduced or in some cases the overlapped region may be omitted. In other words, as shown in FIG. 8A, the following position relationship and state are assumed. That is, display items are in close with each other and the sensitive regions of the starting point item 402 and the end point item 403 overlap, and the cursor 408 is on the end point selection icon 405. In this case, as shown in FIG. 8B, the system control unit 207 shifts (moves) and arranges, by a predetermined value, the sensitive region 412 of the starting point item 402 that has not been selected, in a direction opposite to the end point item 403 having been displayed. Therefore, the overlapped region can be reduced. In some cases, the overlapped region can be omitted. Even when the display items are in close with each other, the user can easily perform an intended touch operation to the display item.

In the above embodiment, the present disclosure is applied to display items for designating a starting point and an end point in a moving image edit. However, the present disclosure is not limited to this case. When sensitive regions corresponding to the display items are arranged so as to be larger than display regions themselves of the display items and the display items are displayed in close with each other, and when the sensitive regions overlap, the present disclosure can be applied. For example, in a music edit, the present disclosure can be applied when a starting point and an end point are designated in order to segment an arbitrary period of time from an entire period of time. In addition, the present disclosure can be applied when a starting point and an end point are designated in order to display an arbitrary range from an entire range of, for example, a table or an image. The present disclosure can be also applied when touch buttons allocated to some functions and having a customizable arrangement are arranged in close with each other, instead of the starting point and the end point.

In the above embodiment, an edit of a moving image that includes a series of images has been described. The present disclosure is not limited to this case. The present disclosure can be also applied when continuously captured still images that include a series of images are edited.

In the above embodiment, there are two display items, i.e., the starting point item 402 and the end point item 403. The present disclosure is not limited to this case. The present disclosure can be also applied when three items or more are arranged.

Control of the system control unit 207 may be performed by a piece of hardware. Alternatively, a plurality of pieces of hardware may share processing so that control of the entire apparatus is performed.

The present disclosure has been described based on the preferred embodiment. The present disclosure is not limited to the specified embodiment. The present disclosure includes various embodiments without departing from the spirit of the present disclosure. Furthermore, the above embodiment is an exemplary embodiment of the present disclosure. The above modifications can be appropriately combined with the above embodiment.

In the above embodiment, the present disclosure applied to a digital camera has been described. The present disclosure is not limited to this case. The present invention can be applied to an electronic apparatus that enables a touch operation to a display item. In other words, the present disclosure can be applied to, for example, a personal computer, a PDA (personal digital assistant), a mobile phone terminal, a portable image viewer, a printer apparatus provided with a display, a digital photo frame, a music player, a game console, and an electronic book reader.

Other Embodiments

The present disclosure can also be implemented by performing the following processing. Specifically, a program that implements functions in the above embodiment is supplied to an electronic apparatus through a network or various storage media so that a computer (for example, a central processing unit (CPU)) of the electronic apparatus reads and executes the program. In this case, the program and a computer-readable storage medium that stores the program constitute the present invention.

According to an embodiment of the present disclosure, even when display items are in close with each other, a touch operation to a display item intended by a user can be performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)), or the like, and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-170465, filed Aug. 25, 2014, which is hereby incorporated by reference herein in its entirety.

What is claimed is:

1. An electronic apparatus comprising:
one or more processors, circuitry, or a combination thereof configured to function as:
a display control unit configured to display a plurality of display items on a display unit;
a detecting unit configured to detect a touch operation to the display unit;
a setting unit configured to set a plurality of sensitive regions for receiving a touch operation to each of the plurality of display items, in a wider region than each of display regions of the plurality of display items;
a selecting unit configured to select any of the plurality of display items, the display items including a start/end item selected in accordance with an operation different from a touch operation;
a moving unit configured to move a touched display item in accordance with a touch operation detected by the detecting unit; and
a reception unit configured to receive, when the detecting unit detects a touch operation to an overlapped region including sensitive regions of the plurality of display items overlapping each other due to approach of the plurality of display items to each other by the moving unit, the detected touch operation as an operation to a display item that has been selected by the selecting unit,
wherein, in a case where a touch operation to an overlapped region is performed, the touch operation corresponds to one of (a) a display item that has been selected and (b) a display item regardless of which display item has been selected,
wherein, in a case where display items having wider touch sensitive regions than display regions are in close with each other and a touch operation to an overlapped region in which the respective touch sensitive regions overlap is detected, the touch operation is received as a touch operation to the display item that has been selected, and
wherein the touched display item is moved in accordance with a touch operation.

2. The electronic apparatus according to claim 1, wherein the overlapped region does not include any display regions of the plurality of display items.

3. The electronic apparatus according to claim 1, wherein the selecting unit selects any of the plurality of display items in accordance with an operation different from a touch operation.

4. The electronic apparatus according to claim 3, wherein the selecting unit selects any of the plurality of display items in accordance with an operation with an operating member that indicates a direction.

5. The electronic apparatus according to claim 4, wherein the operating member includes a first operating member that indicates a first direction or a second direction opposite to the first direction and a second operating member that indicates a different direction from the first direction and the second direction, and
the reception unit receives an operation to a display item that has been selected by the selecting unit in accordance with an operation through the second operating member.

6. The electronic apparatus according to claim 1, wherein the selecting unit selects a display item corresponding to a touched sensitive region when a region that does not include the overlapped region in the sensitive region is touched, in a case where the overlapped region of the sensitive regions of the plurality of display items overlapping each other is caused by approach of the plurality of display regions to each other by the moving unit.

7. The electronic apparatus according to claim 1, wherein the display control unit displays the plurality of display items such that the display regions of the plurality of display items do not overlap.

8. The electronic apparatus according to claim 1, further comprising a notification unit configured to notify of a display item that has been selected by the selecting unit when any one of the plurality of display items has been selected by the selecting unit and when an operation is detected by the detecting unit, the operation being a touch operation that is performed to the overlapped region for moving the display item toward a display item that has not been selected by the selecting unit.

9. The electronic apparatus according to claim 1, wherein the setting unit moves a sensitive region of a display item that has not selected by the selecting unit when any one of the plurality of display items has been selected by the selecting unit and when the overlapped region including sensitive regions of the plurality of display items overlapping each other exists.

10. The electronic apparatus according to claim 1, wherein the plurality of display items includes a first display item and a second display item,
the first display item is a display item with which a user designates a starting point of a range, and
the second display item is another display item with which the user designates an end point of the range.

11. The electronic apparatus according to claim 10, wherein the first display item and the second display item are display items for designating a starting point and an end point, respectively, in a range of at least one of a series of images, music data, or a table.

12. The electronic apparatus according to claim 11, wherein the series of images includes a moving image.

13. A method for controlling an electronic apparatus, comprising:
performing control to display a plurality of display items in a display unit;
detecting a touch operation to the display unit;
setting a plurality of sensitive regions for receiving a touch operation to each of the plurality of display items, in a wider region than each of display regions of the plurality of display items;
selecting any of the plurality of display items, the display items including a start/end item selected in accordance with an operation different from a touch operation;
moving a touched display item in accordance with a touch operation; and
receiving, when the detecting detects a touch operation to an overlapped region including sensitive regions of the plurality of display items overlapping each other due to approach of the plurality of display items to each other by the moving, the detected touch operation as an operation to a display item that has been selected by the selecting, wherein, in a case where a touch operation to an overlapped region is performed, the touch operation corresponds to one of (a) a display item that has been selected and (b) a display item regardless of which display item has been selected,
wherein, in a case where display items having wider touch sensitive regions than display regions are in close with each other and a touch operation to an overlapped region in which the respective touch sensitive regions overlap is detected, the touch operation is received as a touch operation to the display item that has been selected, and
wherein the touched display item is moved in accordance with a touch operation.

14. A non-transitory computer-readable storage medium storing a program for causing a computer to function as each unit of an electronic apparatus comprising:
a display control unit configured to display a plurality of display items on a display unit;
a detecting unit configured to detect a touch operation to the display unit;
a setting unit configured to set a plurality of sensitive regions for receiving a touch operation to each of the plurality of display items, in a wider region than each of display regions of the plurality of display items;
a selecting unit configured to select any of the plurality of display items, the display items including a start/end item selected in accordance with an operation different from a touch operation;
a moving unit configured to move a touched display item in accordance with a touch operation detected by the detecting unit; and
a reception unit configured to receive, when the detecting unit detects a touch operation to an overlapped region including sensitive regions of the plurality of display items overlapping each other due to approach of the plurality of display items to each other by the moving unit, the detected touch operation as an operation to a display item that has been selected by the selecting unit,
wherein, in a case where a touch operation to an overlapped region is performed, the touch operation corresponds to one of (a) a display item that has been selected, and (b) a display item regardless of which display item has been selected,
wherein, in a case where display items having wider touch sensitive regions than display regions are in close with each other and where a touch operation to an overlapped region in which the respective touch sensitive regions overlap is detected, the touch operation is received as a touch operation to the display item that has been selected, and
wherein the touched display item is moved in accordance with a touch operation.

* * * * *